United States Patent
Cakaloglu et al.

(10) Patent No.: US 11,921,754 B2
(45) Date of Patent: Mar. 5, 2024

(54) SYSTEMS AND METHODS FOR CATEGORIZATION OF INGESTED DATABASE ENTRIES TO DETERMINE TOPIC FREQUENCY

(71) Applicant: Walmart Apollo, LLC, Bentonville, AR (US)

(72) Inventors: Tolgahan Cakaloglu, Melissa, TX (US); Wen Liu, Pewaukee, WI (US); Roshith Raghavan, Fayetteville, AR (US); Srujana Kaddevarmuth, Cupertino, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 11 days.

(21) Appl. No.: 17/362,602

(22) Filed: Jun. 29, 2021

(65) Prior Publication Data
US 2022/0414123 A1 Dec. 29, 2022

(51) Int. Cl.
*G06F 16/00* (2019.01)
*G06F 16/28* (2019.01)
*G06N 20/00* (2019.01)

(52) U.S. Cl.
CPC ......... *G06F 16/285* (2019.01); *G06N 20/00* (2019.01)

(58) Field of Classification Search
CPC .............................. G06F 16/285; G06N 20/00
USPC .................................................. 707/600–899
See application file for complete search history.

(56) References Cited

U.S. PATENT DOCUMENTS

| | | | |
|---|---|---|---|
| 9,477,749 B2 | 10/2016 | Matthew et al. | |
| 2009/0282019 A1 | 11/2009 | Galitsky et al. | |
| 2011/0276513 A1 | 11/2011 | Erhart et al. | |
| 2015/0269138 A1* | 9/2015 | Parris | G06F 40/30 704/9 |
| 2022/0198259 A1* | 6/2022 | Dutt | G06N 3/08 |
| 2022/0374598 A1* | 11/2022 | Osuala | G06F 40/279 |

OTHER PUBLICATIONS

Kostic, Bogdan, "Using Transformer-Based Language Models for Sentiment Analysis", Towards Data Science, Found at: https://towardsdatascience.com/using-transformer-based-language-models-for-sentiment-analysis-dc3c10261eec?gi=72e3986fd587, Apr. 8, 2020, 11 pages.

* cited by examiner

*Primary Examiner* — Irete F Ehichioya
*Assistant Examiner* — Shirley D Hicks
(74) *Attorney, Agent, or Firm* — Morgan, Lewis & Bockius LLP; Manita Rawat (57) ABSTRACT

A categorization system can include a computing device that is configured to obtain a plurality of data items over a threshold analysis period from an incoming data database in response to a threshold analysis interval elapsing. The computing device can also be configured to select a categorization model from a model database. The computing device can also be configured to, for each data item of the plurality of data items, apply the categorization model to the data item to identify at least one topic associated with the corresponding data item. The computing device can also be configured to generate a categorization visualization indicating a frequency of data items corresponding to each topic. The computing device can also be configured to transmit the categorization visualization to at least one of: (i) a user interface of an analyst device and (ii) a categorized database.

13 Claims, 9 Drawing Sheets

SYSTEMS AND METHODS FOR CATEGORIZATION OF INGESTED DATABASE ENTRIES TO DETERMINE TOPIC FREQUENCY

TECHNICAL FIELD

The disclosure relates generally to systems and methods for improving categorization and analysis of database entries using improved machine learning models for topic frequency visualization.

BACKGROUND

Manually categorizing feedback items from surveys, social media platforms, etc. is extremely time consuming and subjective. That is, in order to analyze feedback regarding a particular entity, manually reviewing the feedback items not only requires multiple individuals devoted to the review but is subject to human error and inconsistencies when categorizing the feedback items. However, there is a need for these types of feedback items to be consolidated and reviewed by analysts for particular entities to improve user, customer, or employee experience as well as to understand the perception of the entity's performance.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The embodiments described herein are directed to a categorization system and related methods. The categorization system can include a computing device that is configured to obtain a plurality of data items over a threshold analysis period from an incoming data database in response to a threshold analysis interval elapsing. The plurality of data items correspond to at least one parameter. The computing device can also be configured to select a categorization model from a model database based on the at least one parameter of the plurality of data items. The computing device can also be configured to, for each data item of the plurality of data items, apply the categorization model to the data item to identify at least one topic associated with the corresponding data item. The computing device can also be configured to generate a categorization visualization indicating a frequency of data items corresponding to each topic. The computing device can also be configured to transmit the categorization visualization to at least one of: (i) a user interface of an analyst device and (ii) a categorized database.

In another aspect, the computing device is configured to, for each data item of the plurality of data items, apply a sentiment model to the data item to identify a sentiment of the data item and generate the categorization visualization to include the identified sentiment of each data item of the plurality of data items.

In another aspect, the at least one parameter is a language of the data item.

In another aspect, the categorization model corresponds to at least one language.

In another aspect, the categorization model implements a transformer-based machine learning model to determine the at least one topic corresponding to each data item of the plurality of data items.

In another aspect, the categorization model, for each data item of the plurality of data items, compares the data item to a set of known topics, determines a similarity based on a distance value between each of known topic of the set of known topics and the data item, and categorizes the data item as a corresponding known topic of the set of known topics in response to the data item being within a threshold distance of the corresponding known topic.

In another aspect, the categorization model identifies an unknown data item of the plurality of data items as unknown in response to each known topic of the set of known topics being outside the threshold distance.

In another aspect, the computing device is configured to access, via a distributed communications network, a public database, compare the unknown data item to data of the public database, identify a topic title of the unknown data item based on the comparison to data of the public database, and categorize the unknown data item as the topic title, wherein the unknown data item and the topic title are included in the categorization visualization.

In various embodiments of the present disclosure, a method of categorization is provided. In some embodiments, the method can include obtaining a plurality of data items over a threshold analysis period from an incoming data database in response to a threshold analysis interval elapsing. The plurality of data items corresponding to at least one parameter. The method can also include selecting a categorization model from a model database based on the at least one parameter of the plurality of data items. The method can also include, for each data item of the plurality of data items, applying the categorization model to the data item to identify at least one topic associated with the corresponding data item. The method can also include generating a categorization visualization indicating a frequency of data items corresponding to each topic. The method can also include transmitting the categorization visualization to at least one of: (i) a user interface of an analyst device and (ii) a categorized database.

In various embodiments of the present disclosure, a non-transitory computer readable medium is provided. The non-transitory computer readable medium can have instructions stored thereon, wherein the instructions, when executed by at least one processor, cause a device to perform operations that include obtaining a plurality of data items over a threshold analysis period from an incoming data database in response to a threshold analysis interval elapsing. The plurality of data items corresponding to at least one parameter. The operations can also include selecting a categorization model from a model database based on the at least one parameter of the plurality of data items. The operations can also include, for each data item of the plurality of data items, applying the categorization model to the data item to identify at least one topic associated with the corresponding data item. The operations can also include generating a categorization visualization indicating a frequency of data items corresponding to each topic. The operations can also include transmitting the categorization visualization to at least one of: (i) a user interface of an analyst device and (ii) a categorized database.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The features and advantages of the present disclosures will be more fully disclosed in, or rendered obvious by, the following detailed descriptions of example embodiments. The detailed descriptions of the example embodiments are to be considered together with the accompanying drawings wherein like numbers refer to like parts and further wherein.

In the drawings, reference numbers may be reused to identify similar and/or identical elements.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

A categorization system may be implemented in a system or by an entity, for example, an ecommerce marketplace, to categorize ingested data items indicating feedback regarding services provided by the system or corresponding entity. For example, users of a particular system or entity may complete surveys, provide feedback through a social media platform, comment about an entity through a social media platform, complete feedback through a mobile application operated by the entity, etc. Moreover, employees or associates of the entity may also provide feedback regarding the entity through particular surveys or platforms. These numerous sources of feedback are extensive and, when obtained by a system or entity, lack an automated form of analysis or categorization to identify particular topics or sentiments that are frequent among the supplied feedback. The categorization system receives batches of the ingested data items (for example, feedback) to analyze and categorize by implementing trained machine learning models to identify topics of each of the data items as well as a sentiment of each of the data items.

In various implementations, the categorization system implements transformer-based machine learning models, using a novel, improved framework for training the various transformer-based machine learning models, to categorize the data items and generate a visualization of the data items in an aggregated format, indicating frequency of topics, sentiments, etc. Further, the ingested data items may include information regarding a source of the data item (e.g., a customer survey), along with a particular entity location to which the data item or feedback pertains (e.g., a particular store location or ecommerce website). The transformer-based machine learning model approach generates a first machine learning model by leverage functionality of already existing, pre-trained machine learning models for particular steps, including language determination, tagging data items with a particular topic, updating topic data to create a balanced training data set, and the categorization/sentiment determination models. The first versions are stored in a model database and improved upon at threshold intervals, for example, every two months, by generating additional training data to generate an updated version based upon the most recent version of the corresponding machine learning model.

As mentioned, the categorization system includes a language determination model that implements the improved training framework to incorporate data items of a variety of languages. That is, instead of excluding certain languages or relying on a translation of language, which can alter topic identification and evade or obstruct sentiment detection, the categorization system implements the improved training framework to identify languages and continually update or re-train the language determination model. Given the limited labeled data, time, costs and other resource constraints, instead of generating a language model (or any other above-listed model) from scratch for every given task, the categorization system projects the existing global knowledge from pre-trained state-of-the-art deep transformer models by incorporating the local knowledge using a retail dataset to generate better performing multi-lingual models. The pre-trained models have been enhanced with several functionalities and injected with entity-specific data to build a unique and novel solution. Additionally, given the multi-lingual capability of the categorization system, the translation steps are excluded from the pipeline to avoid translation loss of content or meaning.

As also mentioned, the categorization system includes additional transformer-based machine learning models implementing the improved training framework, such as a data tagging module, to continue to improved associating sentences of data items with a particular topic; a topic data update module, to ensure a balanced dataset is provide for each topic using additional data or resources; and a model update module, to continue to build or re-build data categorization models using previous pre-trained models or previous versions of the data categorization model, improving accuracy and speed. In various implementations, the aggregated, categorized data items may generate a visualization of the categorized data items indicating a frequency of topics and associated sentiments. The categorization system may transmit the categorized data items and/or the visualization to a categorized data database for future access and/or directly transmit the generated information to an analyst device for display on a user interface of the analyst device. The categorization system provides a fast and organized method of analyzing data items, for example, weekly, to determine which topic or topics are being frequently mentioned or the sentiments of customers and employees.

Figure 1:
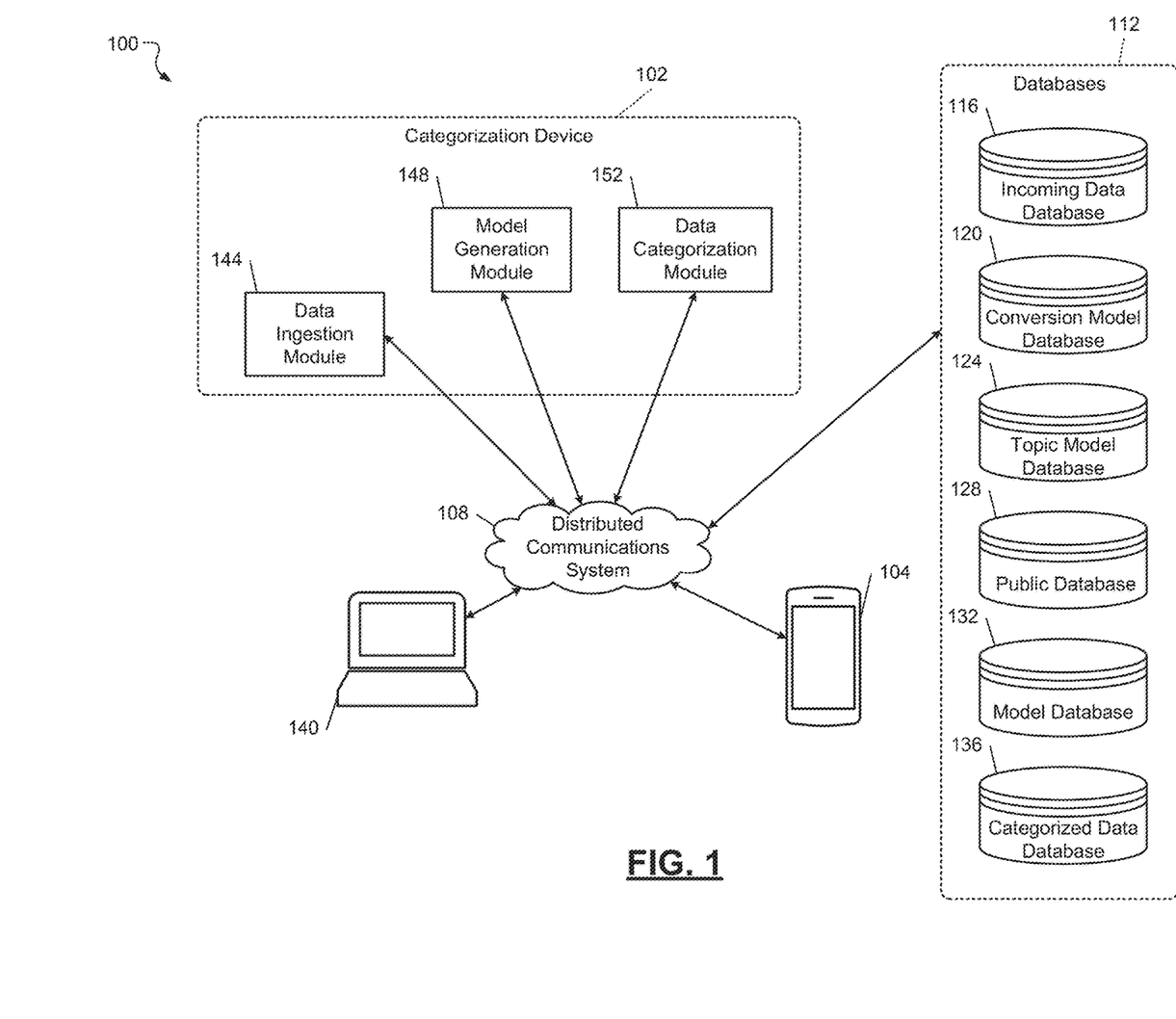
FIG. 1 is a block diagram of a categorization system in accordance with some embodiments.

Referring to FIG. 1, a block diagram of a categorization system 100 is shown. The categorization system 100 may include a categorization device 102 and a customer device 104, such as a phone, tablet, laptop, mobile computing device, desktop, etc., that interacts with the categorization device 102 via a distributed communications system 108. A customer may submit data items or feedback via the customer device 104, which may be stored in one of databases 112 of the categorization system 100. The databases 112 of the categorization system 100 may include an incoming data database 116 for storing the data items received from one or more customer devices 104.

The databases 112 may further include a conversion model database 120 to store machine learning models that convert text strings into numerical representations; a topic model database 124 to identify a topic associated with a data item by applying machine learning models to the data items; a public database 128 to access additionally available data to generate a balanced training data set of data items; a model database 132 to store generated or built machine learning models that determination languages, tag data items with topics, obtain topic data to balance a training dataset, generate updated machine learning models, and identify topics of data items and sentiments of data items; and a categorized data database 136 to store analyzed and categorized data items for analysts associated with an entity (such, as an ecommerce marketplace) operating an analyst device 140 to access and later interpret.

The topics identified may be tiered, including a heading and subheadings. For example, a heading may be "delivery" and subheadings may include "timeliness," "condition," and/or "overall experience." The topics may range from hiring or onboarding feedback from employees to friendliness of employees from customers, including specific store feedback, environmental factors, product availability, etc.

The categorization device 102 includes a data ingestion module 144 that receives the data items from the customer device 104 and forwards the received data items to the incoming data database 116 for storage. The categorization device 102 also includes a model generation module 148 that analyzes data items to generate training data using a variety of machine learning models and generates topic and sentiment machine learning models to apply to received data items for categorization and, eventually, review by analysts of the entity. The model generation module 148 may store the generated machine learning models in the model database 132. The categorization device 102 also includes a data categorization module 152 that may access the generated machine learning models from the model database 132 and apply those models to data items.

The categorization device 102, the customer device 104, and analyst device 140 can each be any suitable computing device that includes any hardware or hardware and software combination for processing and handling information. For example, the term "device" and/or "module" can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, the distributed communications system 108. In various implementations, the devices, modules, and databases may communicate directly on an internal network.

As indicated above, the categorization device 102, the customer device 104, and/or the analyst device 140 can be a computer, a workstation, a laptop, a server such as a cloud-based server, or any other suitable device. In some examples, the customer device 104 and/or the analyst device 140 can be a cellular phone, a smart phone, a tablet, a personal assistant device, a voice assistant device, a digital assistant, a laptop, a computer, or any other suitable device. In various implementations, the categorization device 102, including all the modules and databases 112, is on a central computing system that is operated and/or controlled by a retailer. The categorization device 102 may include modules to execute purchases for items selected by customers using the customer device 104. Additionally or alternatively, the modules and databases of the categorization device 102 are distributed among one or more workstations or servers that are coupled together over the distributed communications system 108.

The described modules and databases of the categorization device 102 can cause an ecommerce marketplace to be displayed or otherwise communicated to the customer device 104 via one or more websites. Customers can view, browse, and order items that may be made available for purchase via the ecommerce marketplace as well as provide feedback to the ecommerce marketplace. The categorization device 102 can collect feedback data or data items via additional modules and databases for categorization and future review/analysis. Similarly, the categorization device 102 can store such information and/or send such information for storage in additional databases of the categorization device 102.

The databases described can be remote storage devices, such as a cloud-based server, a memory device on another application server, a networked computer, or any other suitable remote storage. Further, in some examples, the databases can be a local storage device, such as a hard drive, a non-volatile memory, or a USB stick.

The distributed communications system 108 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The distributed communications system 108 can provide access to, for example, the Internet.

The customer device 104 and the analyst device 140 may communicate with the categorization device 102 over the distributed communications system 108. For example, the categorization device 102 may host one or more websites or obtain feedback from one or more websites. The customer device 104 and the analyst device 140 may be operable to view, access and interact with the websites hosted by the categorization device 102. In various implementations, the customer device 104 may be an employee device providing a method for employees to submit feedback items through particular surveys or platforms, including social media platforms.

Figure 2:
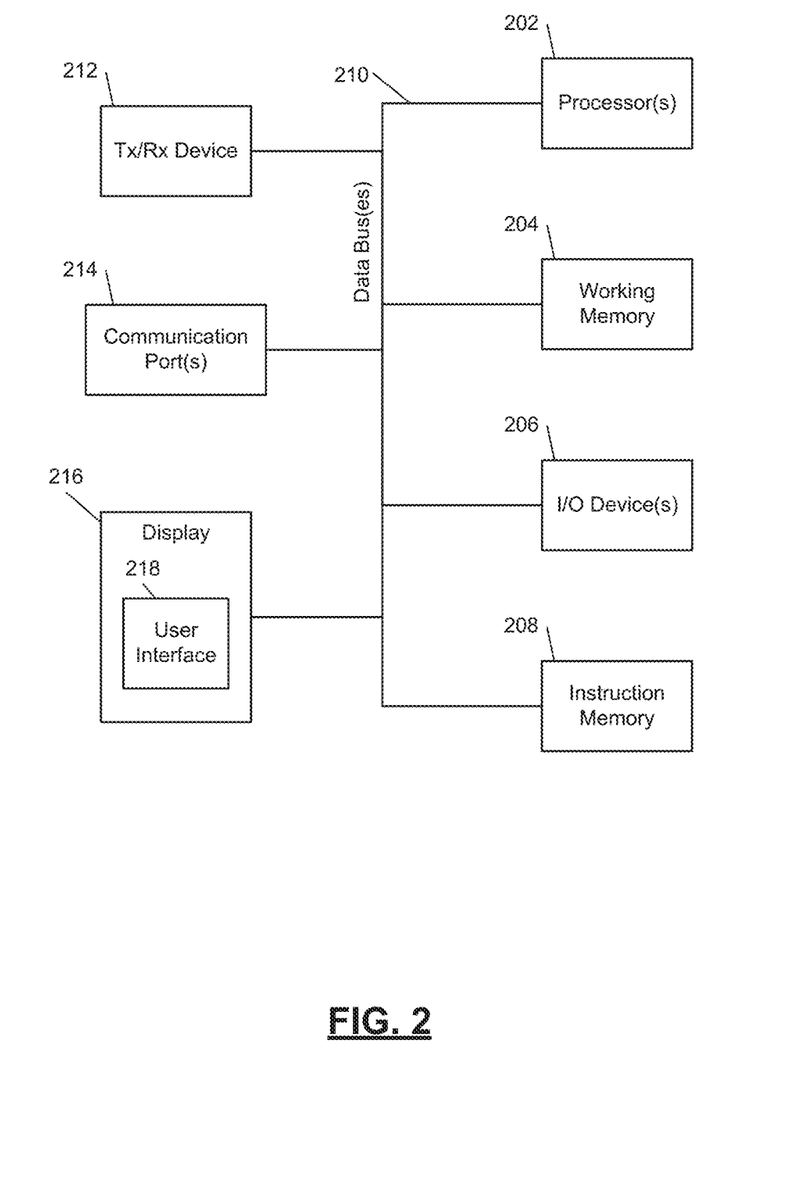
FIG. 2 is a block diagram of a computing device implementing the categorization device of FIG. 1 in accordance with some embodiments.

FIG. 2 illustrates an example computing device 200. The categorization device 102, the customer device 104, and/or the analyst device 140 may include the features shown in FIG. 2. For the sake of brevity, FIG. 2 is described relative to the categorization device 102.

As shown, the categorization device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the categorization device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as data items including feedback information.

Display 216 can display a user interface 218. User interfaces 218 can enable user interaction with the categorization device 102. For example, user interface 218 can be a user interface that allows an operator to interact, communicate, control and/or modify different features or parameters of the categorization device 102. The user interface 218 can, for example, display the performance of the categorization device 102 or the generated categorized data items using different textual, graphical or other types of graphs, tables or the like. In some examples, a user can interact with user interface 218 by engaging input-output devices 206. In some examples, display 216 can be a touchscreen, where user interface 218 is displayed on the touchscreen.

Transceiver 212 allows for communication with a network, such as the distributed communications system 108 of FIG. 1. For example, if the distributed communications system 108 of FIG. 1 is a cellular network, transceiver 212 is configured to allow communications with the cellular network. In some examples, transceiver 212 is selected based on the type of distributed communications system 108 in which the categorization device 102 will be operating. Processor(s) 202 is operable to receive data from, or send data to, a network, such as the distributed communications system 108 of FIG. 1, via transceiver 212.

Figure 3:
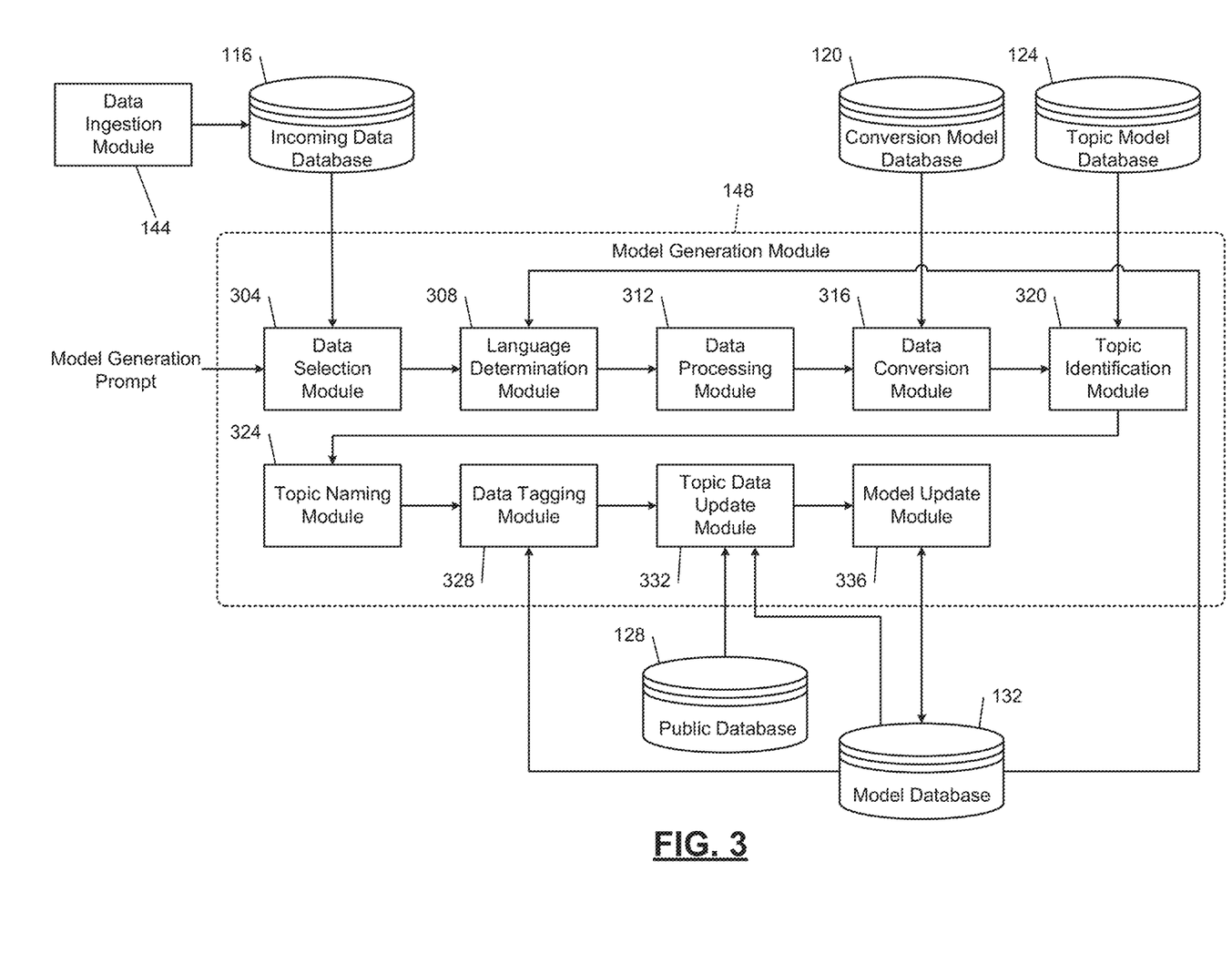
FIG. 3 is a block diagram illustrating an example of a model generation module of the categorization device of FIG. 1 in accordance with some embodiments.

Referring to FIG. 3, further aspects illustrating an example model generation module 148 are shown. As described previously, the model generation module 148 obtains data items from the incoming data database 116 to train and generate machine learning models to identify topics and sentiments when applied to data items. For example, the model generation module 148 may include a data selection module 304 that obtains a set of data items from the incoming data database 116 in response to receiving a model generation prompt. The model generation prompt may be an elapsing threshold interval, such as occurring every month, every two months, upon instruction from an analyst device, etc. The data selection module 304 obtains data items from the incoming data database 116 over a threshold period, including data items ingested since the machine learning models were last updated. The data selection module 304 forwards the obtained data items to a language determination module 308. The language determination module 308 may apply a language machine learning model (stored in the model database 132) to the obtained data items to determine a language of the data items. As mentioned previously, the categorization system 100 identifies language and generates models based on an individual language or a set of languages, instead of translating languages, which may rely on a third party translator and lose important topic and sentiment information.

The model database 132 stores generated models as well as updated machine learning models to apply to language, topic tagging, topic data balancing, and model updating, as will be described below. The models stored in the model database 132 may be transformer-based machine learning models that are improved upon based on additional data items and a previous version of the corresponding machine learning model. The original machine learning model for each model is based on a publicly available, pre-trained transformer model related to the type of model (for example, a pre-trained language determination transformer-based model). In this way, the categorization system 100 employs a variety of machine learning models within the system to improve the accuracy with each set of additional data items, including improving learning rate of the models, as will be further described below.

Once the language determination module 308 determines or identifies the language of the data item or data items, the data items and corresponding language(s) are forwarded to a data processing module 312. The data processing module 312 processes the data items to normalize or adjust the data item, based on the determined language for each data item, for further processing. For example, the data processing module 312 may, for each data item, split sentences apart included in each data item for individual processing, remove stopwords (it/and/the/etc.), remove special characters, remove accented characters, remove uniform resource locators (URLs), remove usernames, remove toxic contents, remove hypertext markup language (HTML), etc. Once processed, the processed data items are forwarded to a data conversion module 316. The data conversion module 316 may apply models or architectures to the processed data items to convert the data items from text strings to numerical representations. The conversion model database 120 may store and the data conversion module 316 may apply pre-trained and/or refined models implementing: RoBERTa, BERT, XLM-RoBERTa, T5, Distilled, BART, Global BM25, Global IDF, etc.

The numerical representations of the data items are forwarded to a topic identification module 320 to identify topics associated with each numerical representation of the data items (that is, determining a topic for each data item, which is an individual sentence after the implementation of the data processing module 312). The topic identification module 320 may access models in the topic model database 124 for the topic identification module 320 to apply to the converted, numerical data items. The models may include Latent Dirichlet Allocation (LDA), non-negative matrix factorization (NMF), k-means clustering, density-based spatial clustering of applications with noise (DBSCAN), hierarchical DBSCAN, deep clustering with autoencoders, etc. These machine learning models may be unsupervised models, each of which are applied to the data items to identify as many topics or potential topics that are represented within each data item.

The data items and corresponding identified topics are forwarded to a topic naming module 324 to automatically name the identified topics, eliminating the need for analysts or individuals to sort through the information manually and develop names for each topic. The topic naming module 324 identifies the processed data items (that is, individual sentences) that are closest to or most similar to each of the topics that were identified by the topic identification module 320. For example, since the sentences are numerically represented, the topics identified from the sentences may compare similarities based on feature vectors. Those sentences that are numerically most similar or "closest" to each topic, within a threshold distance, may be analyzed to determine a topic name. In various implementations, noun chunk or n-gram strategies may be applied to the closest sentences to name the topics.

The topics, topic names, and data items are then forwarded to a data tagging module 328. The data tagging module 328 automates an originally manually intensive process of categorizing the data items. For example, the data tagging module 328 may categorize data items by implementing an embedding search technique which utilizes multi-resolution methods to determine how close a sentence or data item is to a particular, previously identified and named topic. That is, the data tagging module 328 may associate or tag a sentence with a topic by matching topics to sentences/data items based on proximity (closest sentence) by using multi-resolution embedding. Additionally or alternatively, the data tagging module 328 may implement a universal classifier, which implements a refined BART model to tag sentences with topics. Overall, multiple methods may be implemented to tag sentences/data items to determine appropriate topic tags for the obtained data items based on proximity or similarity to the particular topic(s). Similar to the language determination module 308, the data tagging module 328 may implement models from the model database 132 that are continuously trained and improved transformer-based machine learning models trained to tag data items with topics.

The data items, including tags, topics, etc., are forwarded to a topic data update module 332. The topic data update module 332 identifies which topics have a lower, beyond a minimum threshold, amount of associated data items, indicating those topics are underrepresented in the data items. To ensure the training dataset being developed and used to generate a new model is balanced, the topic data update module 332 obtains, for the underrepresented topics, additional data from the public database 128 to include publicly available data related to underrepresented topics in the training dataset. For example, the public database 128 may be accessing particular web resources, including publicly available encyclopedias, dictionaries, or other resources reachable via the distributed communications system 108. The topic data update module 332 may implement transformer-based models from the model database 132 to identify and improve upon the volume of underrepresented topics in the training dataset using publicly available information resources.

The tagged data items, topics, etc. are forwarded to a model update module 336 to generate a machine learning model that updates a previous machine learning model stored in the model database 132 (for example, a pre-trained transformer-based model or an earlier version of a topic categorization or sentiment categorization model) using the presently generated and analyzed training dataset. The generated or updated topic categorization or sentiment categorization model is stored in the model database 132 for access by a variety of modules. While topic categorization is presently described, the model generation module 148 can generate a sentiment categorization model, specifically directing the topic identification module 320 and data tagging module 328 to identify positive and negative topics. Further, for the sentiment categorization model, the topic naming module 324 may be excluded.

Additionally, the model update module 336 may update multiple different categorization models that vary based on a language or a set of languages included. For example, a particular categorization model (for topic or sentiment) may include training data only in a particular language, such as English, while other categorization models may be directed to another language or may be multi-lingual. In various implementations, a categorization or sentiment model may be generated to categorize 100 different languages in a multi-lingual version.

Figure 4:
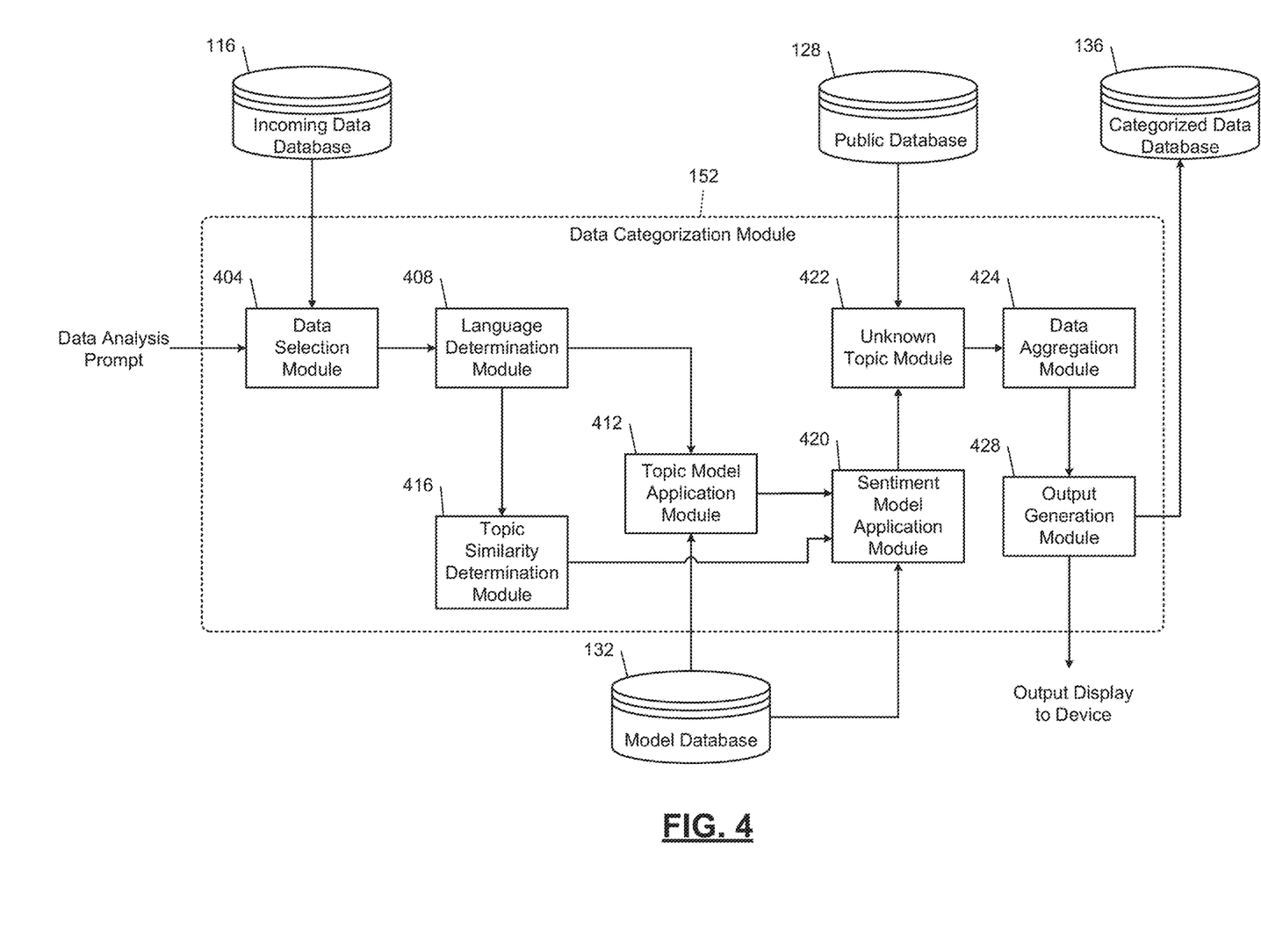
FIG. 4 is a block diagram illustrating an example a data categorization module of the categorization device of FIG. 1 in accordance with some embodiments.

Referring now to FIG. 4, an example data categorization module 152 of the categorization device 102 is shown. As previously described, the data categorization module 152 applies the generated categorization models to data items to generate aggregated visualizations depicting the occurrence or frequency of topics included in the data items or feedback received from customers and/or employees. The data categorization module 152 may include a data selection module 404 the obtains batch data items from the incoming data database 116 at threshold intervals, for example, daily, weekly, etc. in response to the threshold interval elapsing and the data selection module 404 receiving a data analysis prompt indicting the threshold interval elapsed. In various implementations, an analyst may send a data analyst prompt to instruct the data categorization module 152 to generate an aggregated data analysis or visualization of a particular set of data items, including a visualization of the frequency of topics (along with sentiments) existing in data items or feedback items over an indicated period of time. For example, the analyst may instruct the data selection module 404 to select data items over a particular period for a particular state, location, entity, etc., which may be indicated in the data analysis prompt.

Therefore, the data selection module 404 may obtain data items based on the data analysis prompt. The data items are forwarded to a language determination module 408 to identify whether the data items are a specific language, a specific set of languages, multi-lingual, etc. The language determination module 408 may be implemented similarly to the language determination module 308 of FIG. 3, applying an improved and continually trained transformer-based machine learning model. The language determination and data items are forwarded to a topic model application module 412 and a topic similarity determination module 416.

The topic model application module 412 determines which topic or categorization model to apply to the data items based on the identified language. The topic model application module 412 obtains the corresponding topic model from the model database 132 and determines at least one topic in which to categorize each data item. For example, if a data item does not belong to any known topic, the data item may be categorized in an unknown category. The identified topic(s) and corresponding data item are forwarded to a sentiment model application module 420. In various implementations, the selected data items may be processed similar to the description of FIG. 3 by splitting sentences, removing stopwords, etc. and converting the data item into a numerical representation for application of the models.

The topic similarity determination module 416 may compare the data item or sentence to each known topic to determine how similar or how close the data item is to the topic. As previously described, the topic similarity determination module 416 may determine a proximity to each topic and select those topics or categories within a threshold distance of the data item or sentence. In various implementations, if none of the known topics are within the threshold distance of the data item, the topic similarity determination module 416 may categorize the data item as unknown. The topics in which the data item is categorized along with the data item are also forwarded to the sentiment model application module 420. The sentiment model application module 420 obtains a previously stored sentiment model that implements a transformer-based machine learning model from the model database 132 and identifies a sentiment (that is, positive or negative) of the data item.

The identified topics and sentiment of the corresponding data items are forwarded to an unknown topic module 422. That is, if the data item has been categorized into an unknown category, for example, by the topic model application module 412 or the topic similarity determination module 416, the unknown topic module 422 can access public resources, such as the public database 128 (which may access a variety of public resources via the distributed communications system 108) to title the data item since the topic is not known. For example, the unknown topic module 422 may compare the data item to a plurality of dictionary definitions or encyclopedia entries to identify which public item is most similar to the data item. The unknown topic module 422 then categorizes the data item into a new topic, titled based on the identified public item. In various implementations, the new topic is indicated as a new topic in the visualization of the topic frequency data, indicating to an analyst that the data item was categorized into an unknown topic category and public resources were used to title the topic of the data item.

The topics and sentiments of the corresponding data items are then forwarded to a data aggregation module 424 to organize the data items based on, for example, each category or topic and sentiment. If none of the data items belong to an unknown topic, the unknown topic module 422 may simply forward the received data. Alternatively, the data items that have not been categorized in the unknown category may be directly forwarded to the data aggregation module 424. The aggregated data is forwarded to an output generation module 428 to generate a visualization of the analyzed data to depict to an analyst receiving or obtaining the analyzed data items the frequency and occurrence of topics along with the sentiment of the topic (for example, positive employee behavior or negative employee behavior). The output generation module 428 may transmit and store the visualization in the categorized data database 136 or transmit the visualization to a device, such as the analyst device.

Figure 5:
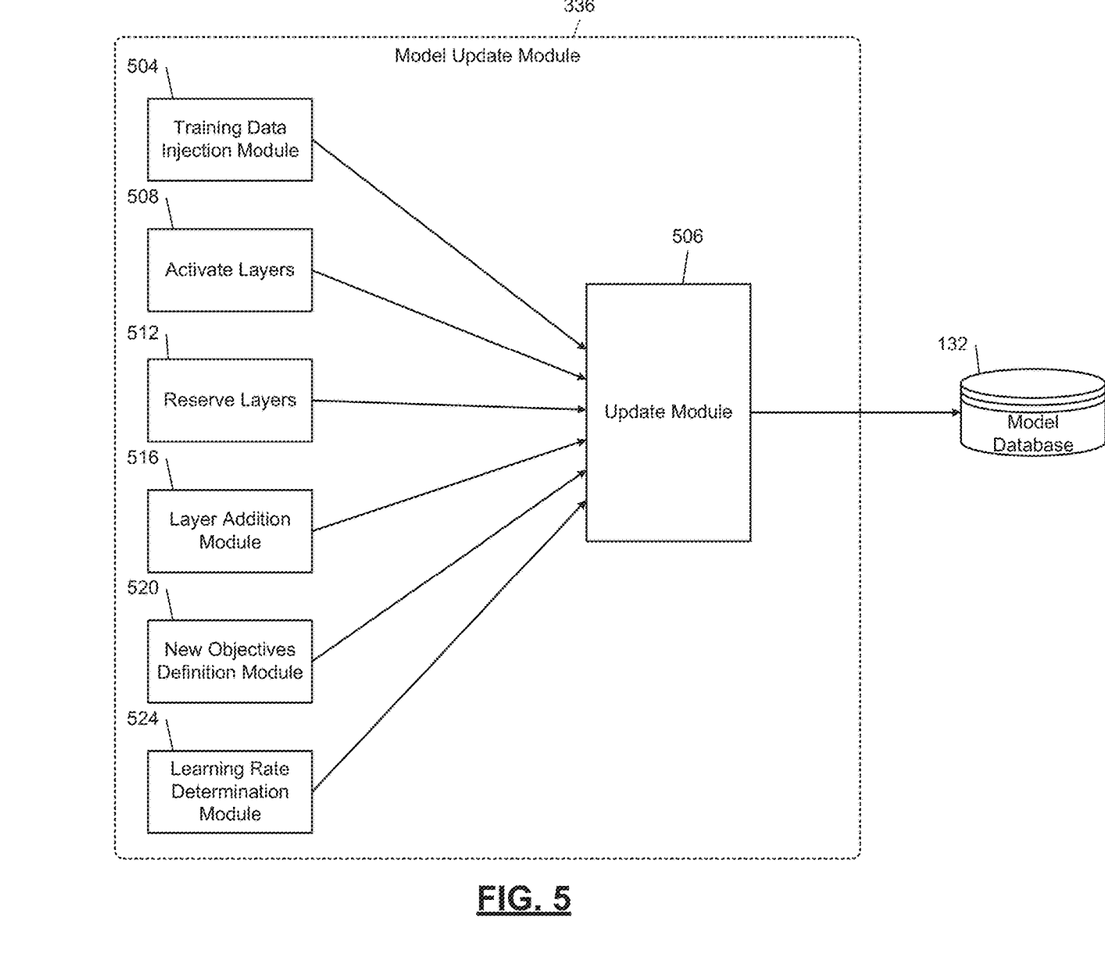
FIG. 5 is a block diagram illustrating an example of a model update module of the categorization device of FIG. 1 in accordance with some embodiments.

Referring now to FIG. 5, an example model update module 336 of the categorization device is shown. The model update module 336 may implement a transformer-based machine learning model to generate and update topic or categorization models and sentiment models as described in FIG. 3. The model update module 336 architecture and implementation may be used for improving and updating the machine learning models applied to the language determination module 308, the data tagging module 328, and the topic data update module 332 of the model generation module 148.

The model update module 336 may include a training data injection module 504 that may receive the processed training data described in FIG. 3 to forward to an update module 506, which generates or builds the transformer-based machine learning models based on the new training data. The training data injection module 504 provides the ability to inject new data items, which allows the machine learning models to improve and be updated periodically. Machine learning models trained on historical data can become obsolete over time and the training data injection module 504 ensures the machine learning models are up to date and based on current data items or feedback items.

Activate layers 508 and reserve layers 512 provide the ability to specify layers to be refined for a given task, which is significant not only because it accelerates training time and lowers training cost but also improves performance of the generated machine learning model as different layers (that is activate layers 508 and reserve layers 512) hold varying degrees of knowledge or information. The ability to refine specific layers is additionally important because different machine learning models peak in performance at different layers, underscoring the importance of being able to discriminate between different layers during training, refinement, and generation. Further, the model update module 336 includes a layer addition module 516, providing the ability to build and attach neural network layers or an entire downstream model to a base model (for example a previous version stored and obtained from the model database 132), allowing for the introduction of new weights that are refined during training. Moreover, the model update module 336 may implement customized loss functions providing the ability to optimize the weights of the machine learning models during backpropagation steps of training and reduce error.

The model update module 336 also includes a new objectives definition module 520 providing the ability to redirect the objectives of the machine learning models specific to the goals of the categorization system 100. The model update module 336 further includes a learning rate determination module 524 to optimize and identify an ideal learning rate of the machine learning model using different strategies, such as triangular learning rates, slanted triangular learning rates, cosine annealing schedule, one-cycle policy to initiate learning rate scheduler. Discriminative refining requires that the various layers are refined using dynamic learning rates instead of one constant learning rate. The update module 506 receives information from each of the modules and layers of the model update module 336 to generate and update, using the generated training datasets, machine learning models incorporating all of the above described considerations. As previously described, the model update module 336 can iteratively update (for example, every two months) each machine learning model described above based on a previous, most recent version to achieve improved quality of the machine learning models each iteration, incorporating new training data.

In further implementations, the model update module 336 may implement other transformer-based machine learning model training architecture. For example, the model update module 336 may include an encoder configured to receive the data items prior to categorization and a decoder may receive the training dataset (or the data items as categorized into topics or sentiments). Based on the feed forward structure of the encoder information, the model update module 336 may improve upon a previously trained version of the machine learning models described throughout the present disclosure to add new training data.

Figure 6:
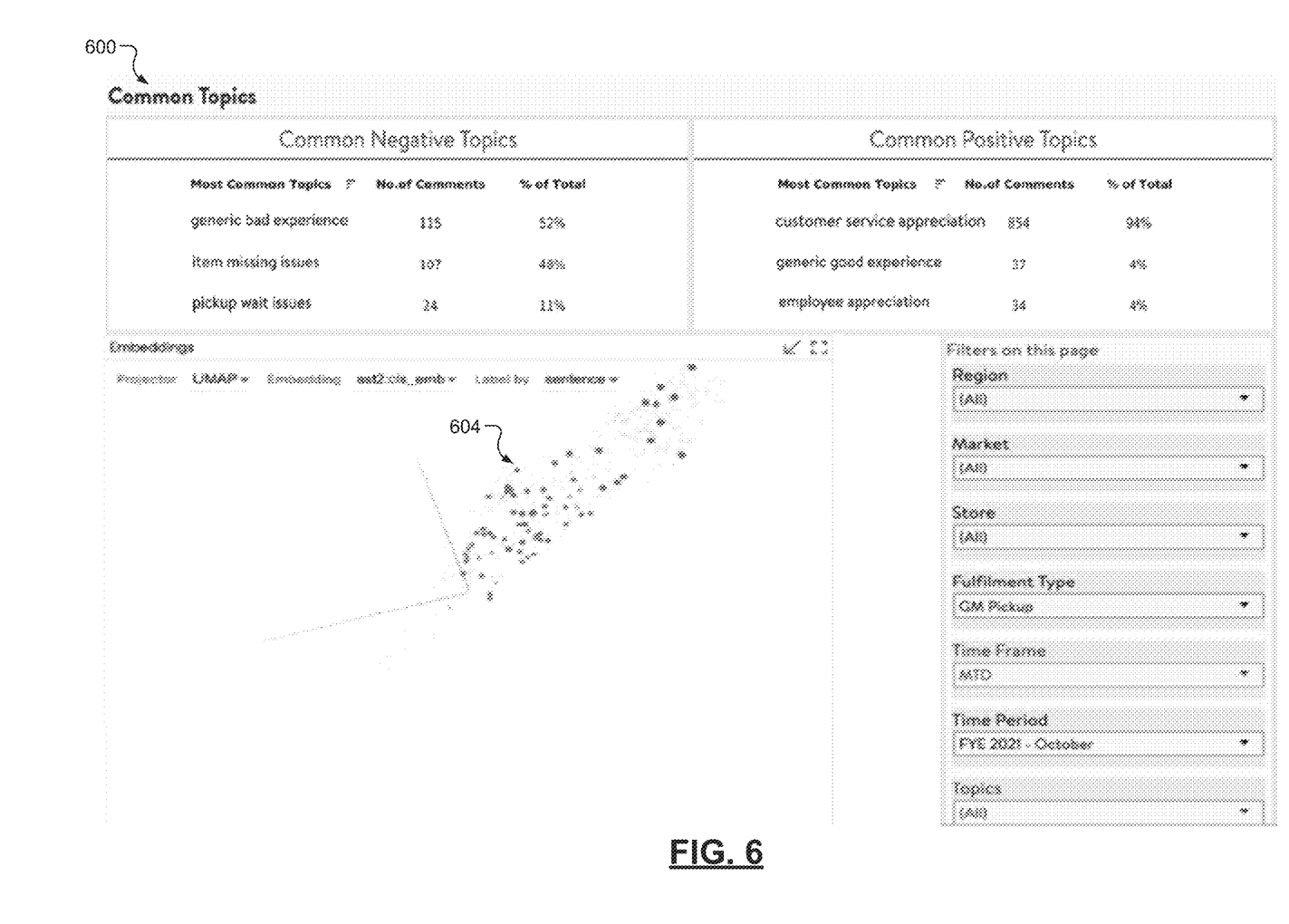
FIG. 6 is a graphical depiction of an example user interface of a visualization of data categorized by the categorization device of FIG. 1.

Referring now to FIG. 6, a graphical depiction of an example user interface 600 of the categorization device 100 is shown. The user interface depicts aggregated common topics based on sentiment, showing common negative topics and common positive topics, indicating which topics are most common among the received feedback items. Further, the user interface 600 includes a filter section, allowing an analyst viewing the user interface 600 to interact with drop down menus and select which data items or feedback items to aggregate and view, such as by region, market, store, fulfilment type, time frame, time period, topics, etc. The user interface further depicts a visualization map, depicting and highlighting topic clusters. In various implementations, an analyst may select or hover over a highlighted cluster, for example, cluster 1 604, and a topic title may be displayed.

Figure 7A:
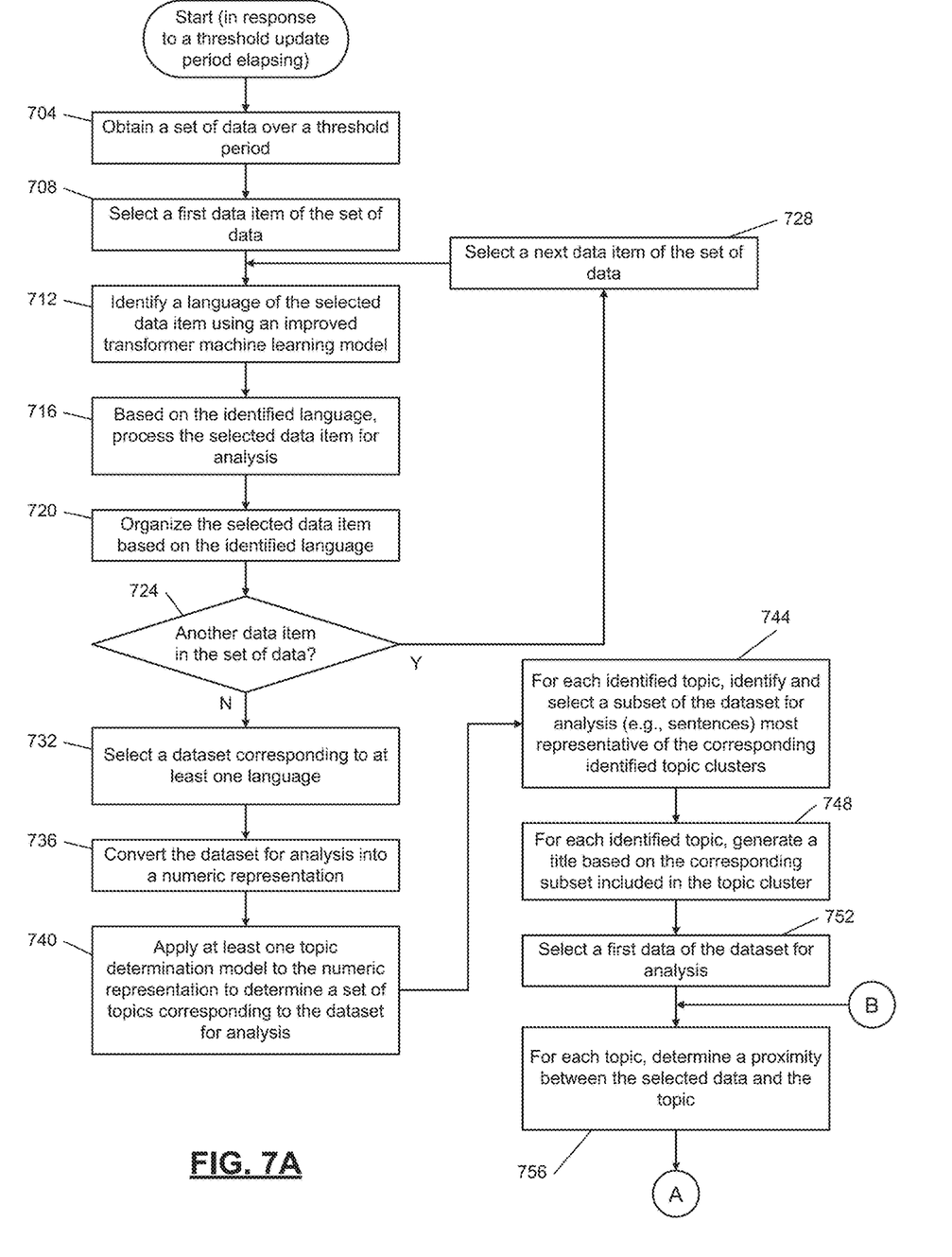
FIGS. 7A & 7B are flowcharts of example methods of generating models for topic and sentiment categorization of ingested data in accordance with some embodiments.
Figure 7B:
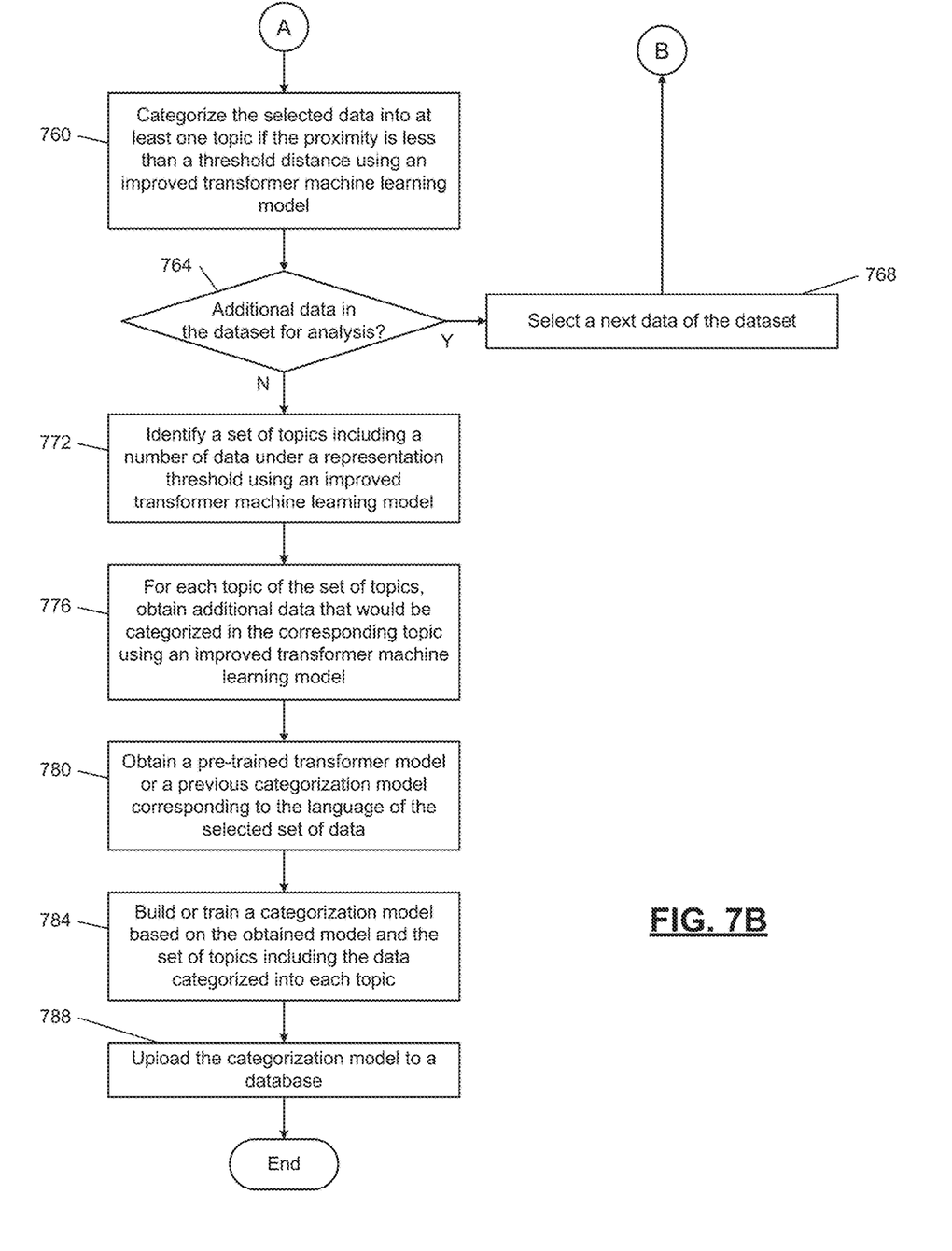

Referring now to FIGS. 7A & 7B, flowcharts of example methods of generating models for topic and sentiment categorization of ingested data are shown. Control begins in response to a threshold model update period elapsing, for example, every two months. That is, topic and sentiment categorization machine learning models may be updated every two months. Control continues to 704 to obtain a set of data over a threshold period, for example, a period corresponding to the most recent update to include all the new training data in the updated machine learning models. Control proceeds to 708 to select a first data item of the set of data. Control continues to 712 to identify a language of the selected data item using an improved transformer machine learning model. Control continues to 716 to, based on the identified language, process the selected data item for analysis. For example, as previously described, the data item is processed to remove stop words, split the data item by sentence, etc. Control continues to 720 to organize the selected data item based on the identified language. For example, data items may be organized by language to develop language-specific machine learning models. In various implementations, the data items are not organized by language and instead are multi-lingual, and are only processed according to the identified language at 716.

Control proceeds to 724 to determine if another data item is in the set of data. If yes, control continues to 728 to select a next data item of the set of data and returns to 712. Otherwise, control proceeds to 732 to select a dataset corresponding to at least one language based on a type of machine learning model being generated. For example, if an English language machine learning model is being generated, only the identified English data items are included in the selected dataset. In various implementations, at the threshold update period, instructions were previously sent, for example, by an analyst, indicating what type of machine learning models to generate (for example, multi-lingual, English, French, etc.).

Control proceeds to 736 to convert the dataset for analysis into a numeric representation, as described in FIG. 3. Control continues to 740 to apply at least one topic determination model to the numeric representations to determine a set of topics corresponding to the dataset for analysis. Control continues to 744 to, for each identified topic, identify and select a subset of the dataset for analysis (for example, each sentence) most representative of the corresponding identified topic clusters. That is, control selects a subset of the dataset that is closest in proximity to each identified topic, selecting the data items within the topic clusters. Control proceeds to 748 to, for each identified topic, generate a title based on the corresponding subset included in the corresponding topic cluster. As previously described, methods such as noun chunk, described in FIG. 3, may be used to analyze the subset of the dataset (each sentence closest in proximity to the topic) to generate a name of the topic.

Control proceeds to 752 to select a first data of the dataset for analysis. Control continues to 756 to, for each topic, determine a proximity between the selected data and the topic. That is, for each sentence or data item, a proximity to each identified topic is determined. Control continues to 760 to categorize the selected data into at least one topic if the proximity is less than a threshold distance using an improved transformer machine learning model. Control continues to 764 to determine if additional data is in the dataset for analysis. If yes, control continues to 768 to select a next data of the dataset and returns to 756. Otherwise, control proceeds to 772 to identify a set of topics including a number of data that is under a representation threshold using an improved transformer machine learning model. That is, control identifies topics that are underrepresented or have less data corresponding to the topic (based on the originally obtained data items) compared to other topics. Control continues to 776 to, for each topic of the set of topics, obtain additional data that would be categorized in the corresponding topic using an improved transformer machine learning model. For example, control obtains additional data available to the public via the Internet (distributed communications system 108) from encyclopedias, dictionaries, and other available and reliable public data sources.

Control proceeds to 780 to obtain a pre-trained transformer model or a previous categorization model corresponding to the language(s) of the selected set of data. Control continues to 784 to build or train a categorization model based on the obtained model and the set of topics including the data categorized into each topic. Control continues to 788 to upload the categorization model to a database for use in categorizing data items. While FIGS. 7A & 7B describe generating a topic categorization model, similar techniques are used to generate sentiment categorization models, which, instead of implementing unsupervised machine learning models to identify topics, may use pre-trained sentiment identification machine learning models. In various implementations, the pre-trained sentiment identification machine learning models are transformer-based and are iteratively improved upon through a variety of versions, as described in FIG. 5. Then, control ends.

Figure 8:
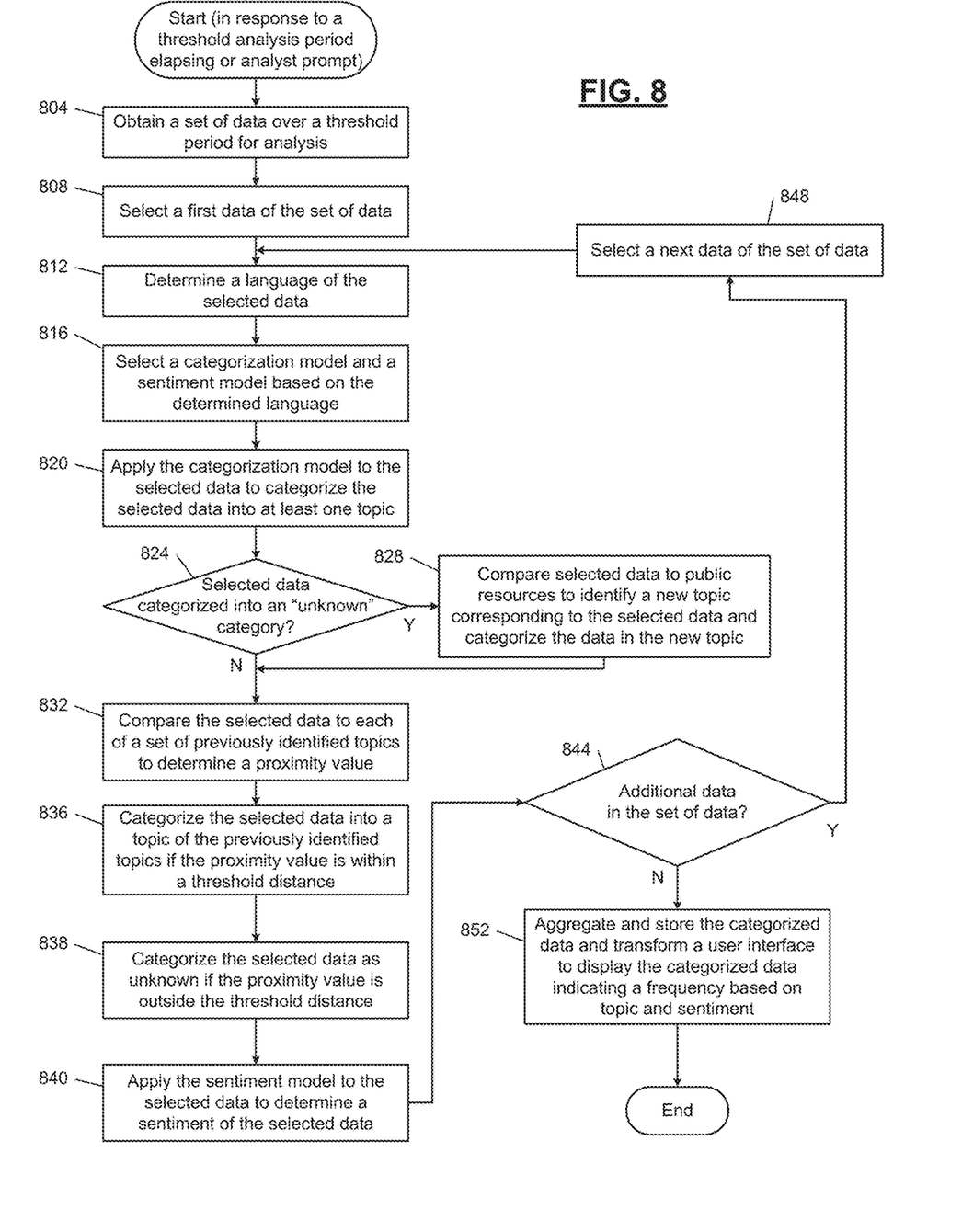
FIG. 8 is a flowchart of example methods of categorizing data ingested from a plurality of resources in accordance with some embodiments.

Referring to FIG. 8, a flowchart of example methods of categorizing data ingested from a plurality of resources is shown. Control begins in response to a threshold analysis period elapsing or based on an analyst prompt. For example, data or feedback items may be analyzed each week. In various implementations, an analyst may prompt analysis of a data set over an indicated period (or various other filters, such as location) in order to analyze specific data.

Control continues to 804 to obtain a set of data over a threshold period for analysis (that is, the threshold analysis period or a period indicated by an analyst). Control continues to 808 to select a first data of the set of data. Control continues to 812 to determine a language of the selected data. Control proceeds to 816 to select a categorization model and a sentiment model based on the determined language. Control proceeds to 820 to apply the categorization model to the selected data to categorize the selected data into at least one topic. Control continues to 824 to determine if the selected data is categorized into an "unknown" category. If yes, control proceeds to 828 to compare the selected data to public resources to create a new topic corresponding to the selected data and categorize the data in the new topic. Otherwise, control directly proceeds to 832 to compare the selected data to each of a set of previously identified topics to determine a proximity value to each previously identified topic.

Control continues to 836 to categorize the selected data into a topic of the previously identified topics if the proximity value is within a threshold distance of the topic. Control continues to 838 to categorize the selected data as unknown if the proximity value is outside the threshold distance. Control proceeds to 840 to apply the sentiment model to the selected data and determine a sentiment of the selected data. Control continues to 844 to determine if additional data is in the set of data. If yes, control continues to 848 to select a next data of the set of data. Otherwise, control proceeds to 852 to aggregate and store the categorized data and transform a user interface to display the categorized data indicating a frequency of data items associated with each topic and sentiment. Then, control ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a computing device configured to:
   obtain a plurality of data items over a threshold analysis period from an incoming database in response to a threshold analysis interval elapsing, the plurality of data items corresponding to at least one parameter;
   select a categorization model from a model database based on the at least one parameter of the plurality of data items;
   for each data item of the plurality of data items, apply the categorization model to the data item and identify at least one topic associated with the corresponding data item, by:
   comparing the data item to a set of known topics;
   determining a similarity based on a distance value between each known topic of the set of known topics and the data item;
   categorizing the data item as a corresponding known topic of the set of known topics when the data item is within a threshold distance of the corresponding known topic; and
   identifying the data item as an unknown data item when the data item is outside the threshold distance of each known topic of the set of known topics;
   for at least one unknown data item in the plurality of data items:
   access, via a distributed communications network, public resources;

compare the at least one unknown data item to public data of the public resources;

generate a new topic, outside the set of known topics, for the at least one unknown data item, wherein the new topic has a title determined based on the public data; and categorize the at least one unknown data item as the new topic;

generate a visualization indicating a frequency of topics based on data items corresponding to each topic, the visualization including the new topic with an indication that the at least one unknown data item was categorized into an unknown topic category and public resources were used to determine the title of the new topic; and transmit the visualization to at least one of: (i) a user interface of an analyst device and (ii) a categorized database.

2. The system of claim 1, wherein the computing device is configured to:

for each data item of the plurality of data items, apply a sentiment model to the data item to identify a sentiment of the data item; and generate the visualization to include the identified sentiment of each data item of the plurality of data items.

3. The system of claim 1, wherein the at least one parameter is a language of the data item.

4. The system of claim 3, wherein the categorization model corresponds to at least one language.

5. The system of claim 1, wherein the categorization model implements a transformer-based machine learning model to determine the at least one topic corresponding to each data item of the plurality of data items.

6. A method comprising:

obtaining a plurality of data items over a threshold analysis period from an incoming database in response to a threshold analysis interval elapsing, the plurality of data items corresponding to at least one parameter;

selecting a categorization model from a model database based on the at least one parameter of the plurality of data items;

for each data item of the plurality of data items, applying the categorization model to the data item and identify at least one topic associated with the corresponding data item, by:

comparing the data item to a set of known topics;

determining a similarity based on a distance value between each known topic of the set of known topics and the data item;

categorizing the data item as a corresponding known topic of the set of known topics when the data item is within a threshold distance of the corresponding known topic; and identifying the data item as an unknown data item when the data item is outside the threshold distance of each known topic of the set of known topics;

for at least one unknown data item in the plurality of data items:

accessing, via a distributed communications network, public resources;

comparing the at least one unknown data item to public data of the public resources;

generating a new topic, outside the set of known topics, for the at least one unknown data item, wherein the new topic has a title determined based on the public data; and categorizing the at least one unknown data item as the new topic;

generating a visualization indicating a frequency of topics based on data items corresponding to each topic, the visualization including the new topic with an indication that the at least one unknown data item was categorized into an unknown topic category and public resources were used to determine the title of the new topic; and transmitting the visualization to at least one of: (i) a user interface of an analyst device and (ii) a categorized database.

7. The method of claim 6, further comprising:

for each data item of the plurality of data items, applying a sentiment model to the data item to identify a sentiment of the data item; and generating the visualization to include the identified sentiment of each data item of the plurality of data items.

8. The method of claim 6, wherein the at least one parameter is a language of the data item.

9. The method of claim 8, wherein the categorization model corresponds to at least one language.

10. The method of claim 6, wherein the categorization model implements a transformer-based machine learning model to determine the at least one topic corresponding to each data item of the plurality of data items.

11. A non-transitory computer readable medium having instructions stored thereon, wherein the instructions, when executed by at least one processor, cause a device to perform operations comprising:

obtaining a plurality of data items over a threshold analysis period from an incoming database in response to a threshold analysis interval elapsing, the plurality of data items corresponding to at least one parameter;

selecting a categorization model from a model database based on the at least one parameter of the plurality of data items;

for each data item of the plurality of data items, applying the categorization model to the data item and identify at least one topic associated with the corresponding data item, by:

comparing the data item to a set of known topics;

determining a similarity based on a distance value between each known topic of the set of known topics and the data item;

categorizing the data item as a corresponding known topic of the set of known topics when the data item is within a threshold distance of the corresponding known topic; and identifying the data item as an unknown data item when the data item is outside the threshold distance of each known topic of the set of known topics;

for at least one unknown data item in the plurality of data items:

accessing, via a distributed communications network, public resources;

comparing the at least one unknown data item to public data of the public resources;

generating a new topic, outside the set of known topics, for the at least one unknown data item, wherein the new topic has a title determined based on the public data; and categorizing the at least one unknown data item as the new topic;

generating a visualization indicating a frequency of topics based on data items corresponding to each topic, the visualization including the new topic with an indication that the at least one unknown data item was categorized into an unknown topic category and public resources were used to determine the title of the new topic; and transmitting the visualization to at least one of: (i) a user interface of an analyst device and (ii) a categorized database.

12. The non-transitory computer readable medium of claim 11, wherein the instructions include:

for each data item of the plurality of data items, applying a sentiment model to the data item to identify a sentiment of the data item; and generating the visualization to include the identified sentiment of each data item of the plurality of data items.

13. The non-transitory computer readable medium of claim 11, wherein:

the at least one parameter is a language of the data item, the categorization model corresponds to at least one language, and the categorization model implements a transformer-based machine learning model to determine the at least one topic corresponding to each data item of the plurality of data items.

* * * * *